United States Patent
Mennig et al.

[11] Patent Number: 6,162,498
[45] Date of Patent: Dec. 19, 2000

[54] METHOD FOR PROVIDING A METAL SURFACE WITH A VITREOUS LAYER

[75] Inventors: Martin Mennig, Quierschied; Gerhard Jonschker, Spiesen-Elversberg; Helmut Schmidt, Saarbruecken-Guedingen, all of Germany

[73] Assignee: Institut für Neue Materialien gemeinnützige GmbH, Saarbrücken, Germany

[21] Appl. No.: 09/402,742

[22] PCT Filed: Apr. 9, 1998

[86] PCT No.: PCT/EP98/02076

§ 371 Date: Oct. 8, 1999

§ 102(e) Date: Oct. 8, 1999

[87] PCT Pub. No.: WO98/45502

PCT Pub. Date: Oct. 15, 1998

[30] Foreign Application Priority Data

Apr. 10, 1997 [DE]  Germany .......................... 197 14 949

[51] Int. Cl.$^7$ ....................................................... B05D 3/02
[52] U.S. Cl. ........................ 427/226; 427/359; 427/397.7; 427/402
[58] Field of Search ..................................... 427/189, 193, 427/203, 204, 372.2, 375, 376.2, 376.4, 397.7, 402, 419.1, 419.2, 419.3, 419.4, 226, 359, 387

[56] References Cited

U.S. PATENT DOCUMENTS 4,636,440  1/1987  Jada ........................................ 427/387
5,182,143  1/1993  Holmes-Farley ........................ 427/409
5,731,091  3/1998  Schmidt et al. ...................... 427/397.7
5,766,680  6/1998  Schmidt et al. ......................... 427/387
6,017,389  1/2000  Schmidt et al. ...................... 106/287.1

*Primary Examiner*—Shrive Beck
*Assistant Examiner*—Paul D. Strain
*Attorney, Agent, or Firm*—Heller Ehrman White & McAuliffe LLP

[57] ABSTRACT

Disclosed is a process for providing a metallic surface with a vitreous layer which is both decorative and scratch resistant and corrosion inhibiting. Said process is characterized in that a coating composition which is obtainable by a process comprising the hydrolysis and polycondensation of one or more silanes of the general formula (I)

$$R_nSiX_{4-n} \qquad (I)$$

wherein the groups X, the same or different from each other, are hydrolyzable groups or hydroxyl groups, the radicals R, the same or different from each other, represent hydrogen, alkyl, alkenyl or alkynyl groups having up to 12 carbon atoms and aryl, aralkyl and alkaryl groups having 6 to 10 carbon atoms, and n is 0, 1 or 2, provided that at least one silane with n=1 or 2 is employed, or oligomers derived therefrom, in the presence of a) nanoscaled $SiO_2$ particles and/or
b) at least one compound selected from the group consisting of the oxides and hydroxides of the alkali and alkaline earth metals;

is applied onto said metallic surface and the resulting coating is thermally densified to form a vitreous layer.

18 Claims, No Drawings

METHOD FOR PROVIDING A METAL SURFACE WITH A VITREOUS LAYER

The present invention relates to a process for providing a metallic surface with a vitreous layer.

Vitreous layers on e.g. steel are generally produced by enamelling processes. For said purpose an adhesive layer is applied thereon, followed by, via a suspension (engobe), a particle-containing composition which upon heating melts to form a glass. Usually said composition is a lead containing glass system (in order to lower the melting point) which is characterized by a relatively high alkali content which serves to match the expansion coefficient of the glass with that of the steel. However, said procedure entails the disadvantage that the resulting enamel layers are usually not completely satisfactory as regards their chemical resistance. In order to obtain closed dense layers, the layer thickness must usually be above 50 μm. This makes the layers inflexible and thereby sensitive to bending, impact and shock (they chip off). Another method is the electrodeposition of chromium oxide interference layers. However, said layers are not scratch resistant and are very sensitive with respect to staining and fingerprints due to their coloring interference effect.

Numerous studies have been conducted as regards the application of thin layers on steel surfaces by means of sol gel techniques. For example, it has been tried to provide stainless steel surfaces with zirconium dioxide layers in order to improve corrosion resistance. Borosilicate glass layers have also been studied. However, it was found that the refractory systems (high melting oxides such as $ZrO_2$) do not result in dense layers via said techniques and that the borosilicate glass layers could only be applied in layer thicknesses of significantly below 1 μm so that a sufficient mechanical and chemical protection could not be secured.

According to the present invention it has now been found that by using specific, organically modified systems based on $SiO_2$ vitreous layers can be formed on metallic surfaces, which layers may be as thick as 10 μm without occurence of cracking upon drying and densification thereof. Said effect is attributed to the improved relaxation behaviour of the organically modified silica gel and silica, respectively, skeletons. Surprisingly it has also been found that such layers can be converted into dense $SiO_2$ films (for example on stainless steel or steel surfaces) already at relatively low temperatures (generally starting from 400° C.). Such films are usually 3 to 5 μm in thickness and form a hermetically sealing layer which prevents or drastically reduces, respectively, the access of oxygen to the metallic surface and secures an excellent protection against corrosion even at elevated temperatures. Such layers are furthermore abrasion resistant so that they can for example be rubbed with steelwool on the surface thereof without leaving any trace. After 100 cycles of Taber-Abrader-test (CS-10F, 500 g) they also show only hardly visible traces. Furthermore they are flexible, i.e., bending or folding the surface does not result in any cracks or other deterioration of the layers.

Additionally, the layers are usually clear as glass and transparent and may be applied in a manner such that the metallic surface will not be changed in its appearance. For example, it is possible to apply such layers on construction parts made of stainless steel without occurence of a change in appearance.

Finally, further, already known colored vitreous layers, for example thin colloid-colored vitreous layers, may be provided on such vitreous layers. Since such colored vitreous layers are preferably prepared by means of coating compositions containing, for example, metal colloid precursors it may thereby be prevented that the metallic surface (or the metal ions released therefrom, respectively) (adversely) affect the reactions of the metal colloid precursors etc., since there will be no direct contact between the metallic surface and the colored vitreous layer. Moreover, silanes having fluorine containing side chains may be used for the formation of the layers provided according to the present invention, resulting in a surface of low energy.

Specifically the present invention provides a process for providing a metallic surface with a vitreous layer, which process is characterized in that a coating composition obtainable by a process comprising the hydrolysis and polycondensation of one or more silanes of the general formula (I)

$$R_n SiX_{4-n} \qquad (I)$$

wherein the groups X, the same or different from each other, are hydrolyzable groups or hydroxyl groups, the radicals R, the same or different from each other, represent hydrogen, alkyl, alkenyl and alkynyl groups having up to 12 carbon atoms and aryl, aralkyl and alkaryl groups having 6 to 10 carbon atoms and n is 0, 1 or 2, provided that at least one silane having n=1 or 2 is used, or oligomers derived therefrom, in the presence of
a) nanoscaled $SiO_2$ particles and/or
b) at least one compound selected from the group consisting of the oxides and hydroxides of alkali and alkaline earth metals, is applied onto said metallic surface and the resulting coating is thermally densified to form a vitreous layer, optionally (and preferably) preceded by a drying operation.

In the present context the above mentioned "nanoscaled $SiO_2$ particles" are to denote $SiO_2$ particles having an average particle size (or an average particle diameter) of not more than 200 nm, preferably of not more than 100 nm and particularly preferred of not more than 50 nm, an upper limit of 30 nm being particularly preferred.

The process according to the present invention will in the following be explained in more detail.

Among the above silanes of the general formula (I) there is at least one silane in the formula of which n has the value of 1 or 2. Usually at least two silanes of the general formula (I) are employed in combination. In that case said silanes are employed in such proportions that the ratio R:Si, i.e., the average value of n (based on moles) ranges from 0.2 to 1.5, preferably from 0.5 to 1.0. It is particularly preferred for said average value of n to range from 0.6 to 0.8.

In general formula (I) the groups X, which may be the same or different from each other, represent hydrolyzable groups or hydroxyl groups. Specific examples of hydrolyzable groups X are halogen atoms (particularly chlorine and bromine), alkoxy groups and acyloxy groups having up to 6 carbon atoms. Particularly preferred are alkoxy groups, especially $C_{1-4}$ alkoxy groups such as methoxy, ethoxy and n- and i-propoxy. Preferably the groups X in a specific silane are identical, methoxy or ethoxy groups being preferably employed.

The groups R in general formula (I) which for n=2 may be the same or different represent hydrogen, alkyl, alkenyl and alkynyl groups having up to 12 (generally up to 8 and preferably up to 4) carbon atoms and aryl, aralkyl and alkaryl groups having 6 to 10 carbon atoms. Specific examples of such groups are methyl, ethyl, propyl and butyl, vinyl, allyl and propargyl, phenyl, tolyl, benzyl and naphthyl. Usually the groups R are unsubstituted. As already mentioned above it may, however, be advantageous to employ at least in part groups R which contain fluorine atoms, particularly alkyl groups and aryl groups having fluorine atoms (preferably not on C-atoms in α- or β-position with respect to Si, however). The corresponding alkyl groups preferably contain more than 3 carbon atoms and with the exception of the α- and β-C-atoms they are preferably perfluorinated.

Preferred groups R are (unsubstituted) alkyl groups having 1 to 4 carbon atoms, especially methyl and ethyl, as well as phenyl; and additionally fluorinated alkyl groups having 4 to 12 carbon atoms.

According to the present invention it is preferred to employ at least two silanes of the general formula (I), wherein in at least one case n=0 and in the other case n=1. Such mixtures of silanes comprise, for example, at least one alkyltrialkoxy silane (e.g. (m)ethyltri(m)ethoxy silane) and at least one tetraalkoxy silane (e.g. tetra(m)ethoxy silane), which silanes are preferably employed in such proportions that the average value of n is in the preferred range specified above.

The nanoscaled $SiO_2$ particles which are employed according to variant (a) of the process according to the present invention in addition to the hydrolyzable silanes of the general formula (I) are preferably employed in such an amount that the ratio of the total Si-atoms in the silanes of the general formula (I) to the total Si-atoms in the nanoscaled $SiO_2$ particles ranges from 5:1 to 1:2, particularly from 4:1 to 2:1. Such nanoscaled $SiO_2$ particles may for example be employed in the form of commercially available silica sols (obtainable e.g. from the company Bayer).

As an alternative or in addition (preferably as an alternative) to the presence of said nanoscaled $SiO_2$ particles the hydrolysis and polycondensation of the silane(s) of the general formula (I) may be carried out in the presence of at least one compound from the group of the oxides and hydroxides of alkali and alkaline earth metals. Said oxides and hydroxides are preferably those of Li, Na, K, Mg, Ca and/or Ba. The use of alkali metal hydroxides, especially NaOH and KOH, is particularly preferred. When using an alkali metal oxide or hydroxide, respectively, it is preferred to employ same in such an amount that the atomic ratio Si:alkali metal ranges from 20:1 to 5:1, especially from 15:1 to 10:1. In any event, the atomic ratio of silica to alkali and/or alkaline earth metal is selected (high enough) so that the resulting coating is substantially insoluble in water.

It is believed that also in the case of variant (b) of the process according to the present invention nanoscaled $SiO_2$ particles are present (which are employed as such in the case of variant (a)), i.e., are formed in situ so that there is no fundamental difference between said variants (a) and (b). Rather, it is assumed that the presence of nanoscaled $SiO_2$ particles in the coating is of essential importance for achieving sufficient layer thicknesses. It is also believed that the presence of groups R in the starting silanes i.a. serves to prevent too strong a crosslinking of the organic $SiO_2$ skeleton (and thereby too strong a stiffening and embrittlement, respectively, of the layer).

The difference between the above variants (a) and (b) resides—if at all—in that in the case of variant (a) the hydrolysis and polycondensation of the silanes of the general formula (I) is usually acid-catalyzed, (preferably inorganic) acids such as hydrochloric acid, nitric acid and (preferably) phosphoric acid being used as catalysts. In contrast thereto, in the case of variant (b) hydrolysis and polycondensation apparently take place in an alkaline medium, which is advantageous especially in the case where metallic surfaces which are not or only slightly resistant to the attack by acids (e.g. made of steel) are to be provided with a vitreous coating according to the process of the present invention. A further advantage of variant (b) is that due to the content of alkaline earth or alkali metals the densification is improved so that, for example, the coating operation can take place in an atmosphere of air without causing damage (blushing) of the underlying metallic (e.g. steel) surface. By using variant (b) it is further possible to provide steel for construction (e.g. ST37, ST50) with a vitreous layer, if carried out with exclusion of air ($N_2$ atmosphere), without causing blushing of the steel upon densification.

The coating composition applied on the metallic surface will subsequently be thermally densified to form a vitreous layer. Prior to said thermal densification a conventional drying operation of the coating composition at room temperature and/or slightly elevated temperature (e.g. at a temperature of up to 100° C., particularly up to 80° C.) will usually be carried out.

Although the (final) temperature of the thermal densification must also be determined in consideration of the heat resistance of the metallic surface, said temperature is usually at least 300° C., particularly at least 400° C. and particularly preferred at least 500° C. If the metallic surface is sensitive to oxidation, especially at such high temperatures, it is recommended to carry out said thermal densification in a oxygen-free atmosphere, e.g. under nitrogen or argon.

According to the present invention, the thickness of the vitreous layer obtained after the thermal densification preferably ranges from 1 to 10 μm, particularly 2 to 7 μm and particularly preferred 3 to 5 μm.

As already mentioned above, (at least) one further (vitreous) layer may be provided on the (usually transparent and colorless) vitreous layer formed according to the process of the present invention, e.g., a functional vitreous layer as it is described in international patent application PCT/EP94/03423 (corresponding to EP-A-729442), or in DE-A-19645043.

Such further layers will, for example, be applied by mixing a composition which is obtainable by hydrolysis and polycondensation of certain (functionalized) silanes with at least one function carrier from the group of the temperature resistant dyes and pigments, metal or non-metal oxides, coloring metal ions, metal or metal compound colloids and metal ions which form metal colloids under reducing conditions, applying the composition mixed with said function carrier onto the surface to be coated and thermally densifying the coating to form a (colored) vitreous layer. Alternatively, a (colored) layer may be provided by applying onto the surface to be coated a coating composition containing at least one element capable of forming a vitreous, crystalline or partially crystalline oxide in the form of a compound which is capable of affording said oxide upon thermal treatment and is present in an at least predominantly aqueous medium as solution or sol, as matrix-forming component, and at least one member from the group of metal, metal compound and metal alloy colloids and metal compounds forming metal colloids under reducing conditions, as coloring component, and thermally curing the resulting coating. As elements capable of forming a vitreous, crystalline or partially crystalline oxide Ti and Zr may, for example, be mentioned.

Such a colored vitreous layer may be provided on the vitreous layer produced according to the present invention, for example by providing the coating which is formed according to the present invention on the metallic surface prior to the thermal densification (and preferably following its drying at room temperature and/or elevated temperature) of the former with a coating composition for said colored vitreous layer and thermally densifying said two coatings together. It is, of course, also possible to incorporate coloring components (for example the ones mentioned above) directly into the coating composition to be employed according to the present invention, but this is not preferred.

As metallic surfaces to be coated according to the present invention all surfaces consisting of (or comprising, respectively) a metal or a metal alloy are suitable.

As examples for metal alloys (stainless) steel, brass or bronze are to be mentioned particularly, the coating of stainless steel being particularly preferred according to the present invention.

As examples of metallic surfaces those of aluminum, tin, zinc, chromium or nickel (including zinc- or chromium-plated surfaces) may be mentioned.

Prior to the application of the coating composition the metallic surface is preferably thoroughly cleaned (particularly freed of grease and dust). Prior to the coating operation a surface treatment (e.g. by roughening or corona discharge) may be carried out but is neither necessary nor preferred according to the present invention.

The hydrolysis and polycondensation of the silanes of the general formula (I) may be carried out in the presence or absence of an organic solvent. Preferably no organic solvent is present. When using an organic solvent, the starting components are preferably soluble in the reaction medium (which usually includes water). As organic solvents water-miscible solvents such as, e.g., mono- or polyhydric aliphatic alcohols (e.g. methanol, ethanol), ethers (such as diethylether), esters (such as ethylacetate), ketones, amides, sulfoxides and sulfones are particularly suitable. Said solvents may optionally also be added to the final coating composition in order to provide a viscosity which is suitable for the coating operation.

Otherwise, hydrolysis and polycondensation may be carried out according to modalities known to the skilled person.

The coating composition employed according to the present invention may be applied onto the metallic surface according to conventional coating methods. Examples of techniques which may employed are dipping, casting, spinning, spraying or brushing. Particularly preferred are dipping processes.

It remains to be noted that the thermal densification may optionally also be effected by IR or laser radiation. Also, it is possible to produce structured coatings by selective action of heat thereon.

The process according to the present invention is particularly—but not exclusively—suited for the coating of articles of everyday use which have a metallic surface or consist of metal, respectively. Thus, metallic surfaces (e.g. steel surfaces) which can be found, e.g., with panels, cuttlery, bowls, sinks, door and window handles and the like may be coated.

The present invention provides a decorative system which can advantageously be applied onto metallic surfaces (e.g. made of (stainless) steel), is weathering resistant and insensitive to scratching and also assists in the prevention of staining, e.g., by fingerprints, etc.

The following examples illustrate the present invention.

EXAMPLE 1
Preparation of a $SiO_2$ coating sol

A mixture of 20 ml of methyltriethoxy silane and 6 ml of tetraethoxy silane is provided and with vigorous stirring 15 g of silica sol (Bayer Kieselsol Typ 300, 30% by weight (concentrated to 45% by weight)) is added thereto. Following the formation of an emulsion (after about 20 seconds) 0.3 ml of $H_3PO_4$ (concentrated) are added to initiate the hydrolysis. The mixture stays turbid for another 20 to 60 seconds and thereafter immediately turns first viscous and then highly liquid and clear. During said reaction the temperature of the sol increases to about 40° C. Following the cooling to room temperature (optionally in an ice bath) the resulting sol is filtered through a filter of a pore size of 0.8 $\mu$m (having a prefilter of a pore size of 5 $\mu$m). The viscosity of the sol thus prepared may be adjusted to a desired value by means of e.g. ethanol, propanol or alcohol mixtures and it may be used for the coating operation for at least 6 hours.

EXAMPLE 2
Preparation of a sodium silicate coating sol 25 ml (124.8 mmoles) of methyltriethoxy silane (MTEOS) are stirred with 7 ml (31.4 mmoles) of tetraethoxy silane (TEOS) and 0.8 g (20 mmoles) of sodium hydroxide overnight (for at least 12 hours) at room temperature until all of the sodium hydroxide has dissolved and a clear yellow solution is formed.

Subsequently 3.2 ml (177.8 mmoles) of water are slowly added dropwise at room temperature, resulting in a rise of the temperature of the solution. After completion of the addition of water the clear yellow solution is stirred at room temperature until it is cooled off again and is subsequently filtered through a filter having a pore size of 0.8 $\mu$m.

EXAMPLE 3
Preparation of a potassium silicate coating sol

Example 2 is repeated, except that 0.8 g of sodium hydroxide is replaced by 0.8 g (12.1 mmoles) of potassium hydroxide.

EXAMPLE 4

Cleaned substrates (stainless steel 1.4301, brass and aluminum) were dip-coated at a drawing speed of 4–6 mm/s with the coating compositions described in Examples 1 to 3, predried for a short period of time (10 minutes) at room temperature and subsequently dried at 80° C. for 1 hour. For densification the dried substrates were heated in air (or under nitrogen in the case of coating stainless steel with the coating composition from Example 1) at a heating rate of 1 K/minute to 500° C. (or 400° C. in the case of aluminum) and maintained at said temperature for 1 hour.

The layer thicknesses after the densification were 2 to 4 $\mu$m. HREM studies on the coatings on steel and aluminum showed a layer free of defects.

The blushing of the stainless steel upon densification could almost completely be prevented by the coating. Furthermore the layer showed no damaged portions even after 1000 hours in the salt spray test.

The coated brass and aluminum showed no corrosion damage after 3000 hours of corrosion test in the salt spray chamber (DIN 50021), whereas the part that had not been coated became completely corroded.

EXAMPLE 5
Standard anti-adhesion material MTKF 1% by mole of FTS

Methyltriethoxy silane (MTEOS) (0.2 moles, 35,7 g) and TEOS (0.054 moles, 11.3 g) are stirred in a suitable vessel (e.g. a 250 ml Schott bottle) and 0.1 moles of $SiO_2$ (in 20.0 g of silica sol 300/30%) are added thereto. After 5 minutes 0.4 g of concentrated HCl are added with intensive stirring. The initial two-phase reaction mixture turns white after 2 minutes, heats up and becomes transparent and single-phased again. After 15 minutes of reaction 3.0 g of DOWEX®50W2 are added and the resulting mixture is stirred for 10 minutes. Subsequently, a pressure filtration through a fiberglass prefilter is carried out. Immediately thereafter 1.78 g (1% by mole based on Si) of 1H,1H,2H, 2H-perfluorooctyltriethoxy silane (FTS) are added and the sol is stirred again for 15 minutes. Amberlyst®A-21 (4.0 g) is added and stirring is continued for 30 Minutes. Following a pressure filtration through a membrane filter (pore size 1 µm) 140 g of isopropanol are added for dilution. Following a pressure filtration through a membrane filter (pore size 0.2 µm) the sol is finally ready for the coating operation.

The application of the sol onto a stainless steel surface is carried out by means of spraying and the curing is effected at 350° C. under an air atmosphere. The material of the coating is a transparent anti-adhesion layer showing contact angles of 110° against water and of 60° against hexadecane, respectively.

EXAMPLE 6

Alkalinically hydrolyzed system having 11% by moles of FTS

A suitable Schoft bottle is charged with 0.1 moles (17.9 g) of MTEOS, 0.027 moles (5.6 g) of TEOS and 0.016 moles (8.16 g; 11% by mole based on Si) of FTS. Subsequently, 0.018 moles of NaOH (0.72 g) are added with stirring and stirring is continued for about 16 hours. Thereafter, 0.15 moles (2.7 g) of $H_2O$ are added dropwise to the solution which meanwhile has turned yellow. After completion of the addition stirring is continued for about 30 minutes. Subsequently the mixture is diluted with 35 g of ethanol and filtered through a 1 µm filter by means of pressure filtration.

The final sol is applied on a stainless steel plate by means of spray coating and cured at 350° C. under an atmosphere of air. Said system does not show the discoloration of substrates made of stainless steel which is usually observed at these temperatures. The layer is completely transparent and shows contact angles against water of 95° and against hexadecane of 40°, respectively.

We claim:

1. A process for providing a metallic surface with a vitreous layer, comprising:
   (a) preparing a coating composition by a process comprising hydrolyzing and polycondensing one or more silanes of the formula $R_nSiX_{4-n}$, 

where
   each R, which may be the same or different, is hydrogen, or an optionally fluorinated alkyl, alkenyl, or alkynyl group having up to 12 carbon atoms, or an optionally fluorinated aryl, aralkyl, or alkaryl group having 6 to 10 carbon atoms,
   each X, which may be the same or different, is a hydrolyzable group or a hydroxyl group, and
   n is 0, 1 or 2, provided that at least one silane has n=1 or 2, or one or more oligomers derived therefrom,
   in the presence of nanoscale $SiO_2$ particles and at least one compound selected from the group consisting of the oxides and hydroxides of the alkali and alkaline earth metals,
   where the ratio of total Si atoms in the one or more silanes to total alkali metal and alkaline earth metal atoms in the at least one compound selected from the group consisting of the oxides and hydroxides of the alkali and alkaline earth metals is between 20:1 and 5:1;
   (b) applying the coating composition to the metallic surface to form a coating; and
   (c) thermally densifying the coating to form a transparent vitreous layer.

2. A process of claim 1 where the average value of n is between 0.2 and 1.5.

3. A process of claim 1 where the or each X is alkoxy.

4. A process of claim 3 where the or each X is methoxy or ethoxy.

5. A process of claim where the or each R is optionally fluorinated $C_{1-4}$ alkyl or phenyl.

6. A process of claim 1 where the one or more silanes are one or more of methyltrimethoxysilane, methyltriethoxysilane, ethyltrimethoxysilane, ethyltriethoxysilane, tetramethoxysilane, and tetraethoxysilane.

7. A process of claim 1 where at least one R of the one or more silanes is fluorinated.

8. A process of claim 1 where the ratio of total Si atoms in the one or more silanes to total Si atoms in the nanoscale $SiO_2$ particles is between 5:1 and 1:2.

9. A process of claim 1 where the at least one compound selected from the group consisting of the oxides and hydroxides of the alkali and alkaline earth metals comprises one or more of the oxides and hydroxides of Li, Na, K, Mg, Ca, and Ba.

10. A process of claim 9 where the at least one compound is sodium hydroxide or potassium hydroxide.

11. A process of claim 1, additionally comprising drying the coating before thermally densifying it.

12. A process of claim 1 where thermally densifying the coating takes place at temperatures of at least 400° C.

13. A process of claim 1 where the thickness of the resulting layer is between 1 µm and 10 µm.

14. A process of claim 1 for providing a metallic surface with a colored vitreous layer, additionally comprising:
   applying to the metallic surface having a coating thereon at least one further coating composition, which upon thermal densification results in a colored vitreous layer, to form a further coating; and
   thermally densifying the further coating to obtain a colored vitreous layer.

15. A process of claim 1 for providing a metallic surface with a colored vitreous layer, additionally comprising:
   applying to the metallic surface having a transparent vitreous layer thereon at least one further coating composition, which upon thermal densification results in a colored vitreous layer, to form a further coating; and
   thermally densifying the further coating to obtain a colored vitreous layer.

16. A process of claim 1 where the metallic surface is a metal alloy.

17. A process of claim 1 where the metallic surface is aluminum, tin, zinc, chromium, or nickel.

18. A process of claim 1 where the metallic surface is the metallic surface of a panel, item of cutlery, cooking utensil, sink, or a door or window handle.

* * * * *